(12) United States Patent
Germata et al.

(10) Patent No.: US 7,374,368 B2
(45) Date of Patent: May 20, 2008

(54) METHOD AND APPARATUS FOR SLIP-LINING

(75) Inventors: Daniel Thomas Germata, Wadsworth, IL (US); Allen James Spivey, West Dundee, IL (US)

(73) Assignee: Gas Technology Institute, Des Plaines, IL (US)

( * ) Notice: Subject to any disclaimer, the term of this patent is extended or adjusted under 35 U.S.C. 154(b) by 500 days.

(21) Appl. No.: 11/168,120

(22) Filed: Jun. 28, 2005

(65) Prior Publication Data

US 2006/0177258 A1 Aug. 10, 2006

Related U.S. Application Data

(60) Provisional application No. 60/647,700, filed on Jan. 27, 2005.

(51) Int. Cl.
*F16L 55/18* (2006.01)

(52) U.S. Cl. .................................. 405/184; 405/184.2
(58) Field of Classification Search ................ 405/184, 405/154.1, 184.1, 184.2
See application file for complete search history.

(56) References Cited

U.S. PATENT DOCUMENTS 3,211,574 A * 10/1965 Shannon ...................... 427/238
5,736,736 A * 4/1998 Dickson et al. ............. 405/184

* cited by examiner

*Primary Examiner*—John Kreck
(74) *Attorney, Agent, or Firm*—Mark E. Fejer (57) ABSTRACT

An apparatus for slip-lining a pipeline with plastic pipe including a slip-line cable having four sections—a forward navigation section, an intermediate locking section connected to a back end of the forward navigation section, a rearward drive section connected to a back end of the intermediate locking section, and an impact driver connected to the rearward drive section. Also disclosed is a method for slip-lining a pipeline with plastic pipe.

8 Claims, 7 Drawing Sheets

METHOD AND APPARATUS FOR SLIP-LINING

CROSS REFERENCE TO RELATED APPLICATION

This application claims the benefit of provisional U.S. patent application Ser. No. 60/647,700 filed 27 Jan. 2005.

BACKGROUND OF THE INVENTION

1. Field of the Invention

This invention relates to a method and apparatus for slip-lining underground utility pipelines, both service lines and main lines. Slip-lining is a technique whereby a new plastic pipe is inserted into an existing pipeline, typically as a means for replacing the existing pipeline as the carrier, increasing the operational pressure of the pipeline, or improving the operating integrity of the pipeline.

2. Description of Related Art

To replace a leaking or deteriorated gas service line, utilities often insert a new plastic pipe through an existing pipe. The existing pipe is typically steel, but may be made of cast iron or any other material used for conduit. Generally, the pipe is replaced because of its age or operating condition, but other factors such as "preventative maintenance" or a need for changed operating conditions for which the existing pipe is not suited can warrant the replacement. The slip-line technique is used to reduce costs, risks, and inconveniences associated with trenching or boring in order to install the new pipe.

Slip-lining a gas service currently consists of initially excavating at each end of the pipe to be replaced, disconnecting the service from the main, disconnecting the service from the meter-set, then usually pushing either ½, ¾, or 1 inch plastic pipe, typically polyethylene (PE) pipe, through the "straight" section of existing pipe and connecting the plastic pipe back to the meter and main. Conventional slip-lining is not performed through pipes that have offsets. For those pipes having offsets, if slip-lining is practical at all, a hole is dug to remove the bend or offset so that the new plastic pipe can be inserted in both sections of straight pipe. Replacement of the main line may also be performed along with the service line replacements, using the insertion or slip-line method. To connect the new plastic service line to the newly inserted main line, a section of the old main line must be cut out to expose the new main line disposed within the old main line and to facilitate the attachment of the new plastic service to a new service connection fitting installed on top of the new main.

SUMMARY OF THE INVENTION

It is one object of this invention to provide a method and apparatus for reliable slip-lining of existing underground pipelines.

It is yet another object of this invention to provide a method and apparatus for slip-lining of existing underground pipelines comprising offsets, including the service tee on the main line, without the need to excavate at the offsets.

It is another object of this invention to provide a method and apparatus for slip-lining of both the service line and the street main line without having to dig a trench.

These and other objects of this invention are addressed by an apparatus for slip-lining a pipeline with plastic pipe, which apparatus comprises a slip-line cable having an outside diameter less than an inside diameter of the plastic pipe. The slip-line cable comprises a flexible forward navigation section having a leading end and a trailing end, an intermediate locking section having an intermediate leading end connected to the trailing end of the flexible forward navigation section and having an intermediate trailing end, and a rearward drive section having a front end connected to the intermediate trailing end and having an opposite drive end. The intermediate locking section comprises locking means for temporarily preventing the slip-line cable from moving relative to the plastic pipe. To push or drive the plastic pipe into the host pipe, the apparatus further comprises drive means for driving the plastic pipe into the main pipeline, which drive means are lockably connected to the drive end of the rearward drive section. This apparatus enables the insertion of a new service line through an existing service line and an offset or bend in the existing pipeline and through an existing service tee and typically, one 90° elbow near the service tee and a 90° drop down through the existing service tee, into the existing main line.

The slip-line cable employed in the apparatus and method of this invention is a push-pull type cable. That is, the cable engages the inside surface of the plastic pipe as it pushes the plastic pipe into the pipeline, after which it is disengaged from the inside surface of the plastic pipe and retracted, or pulled back, and out of the new plastic service pipe. Thereafter, it again engages the inside surface of the plastic pipe for a second pushing of the plastic pipe into the pipeline. This sequence of operations is repeated until the plastic pipe is in the desired location within the pipeline. The flexible forward navigation section of the slip-line cable is the means by which the slip-line cable is able to pass through offsets in the pipeline. The intermediate locking section is the means by which the slip-line cable is able to engage and disengage from the inside surface of the plastic pipe. The rearward drive section, in combination with the drive means, is the means by which the plastic pipe is pushed, or driven, into the host pipe.

BRIEF DESCRIPTION OF THE DRAWINGS

These and other objects and features of this invention will be better understood from the following detailed description taken in conjunction with the drawings, wherein.

DETAILED DESCRIPTION OF THE PRESENTLY PREFERRED EMBODIMENTS

Figure 1:
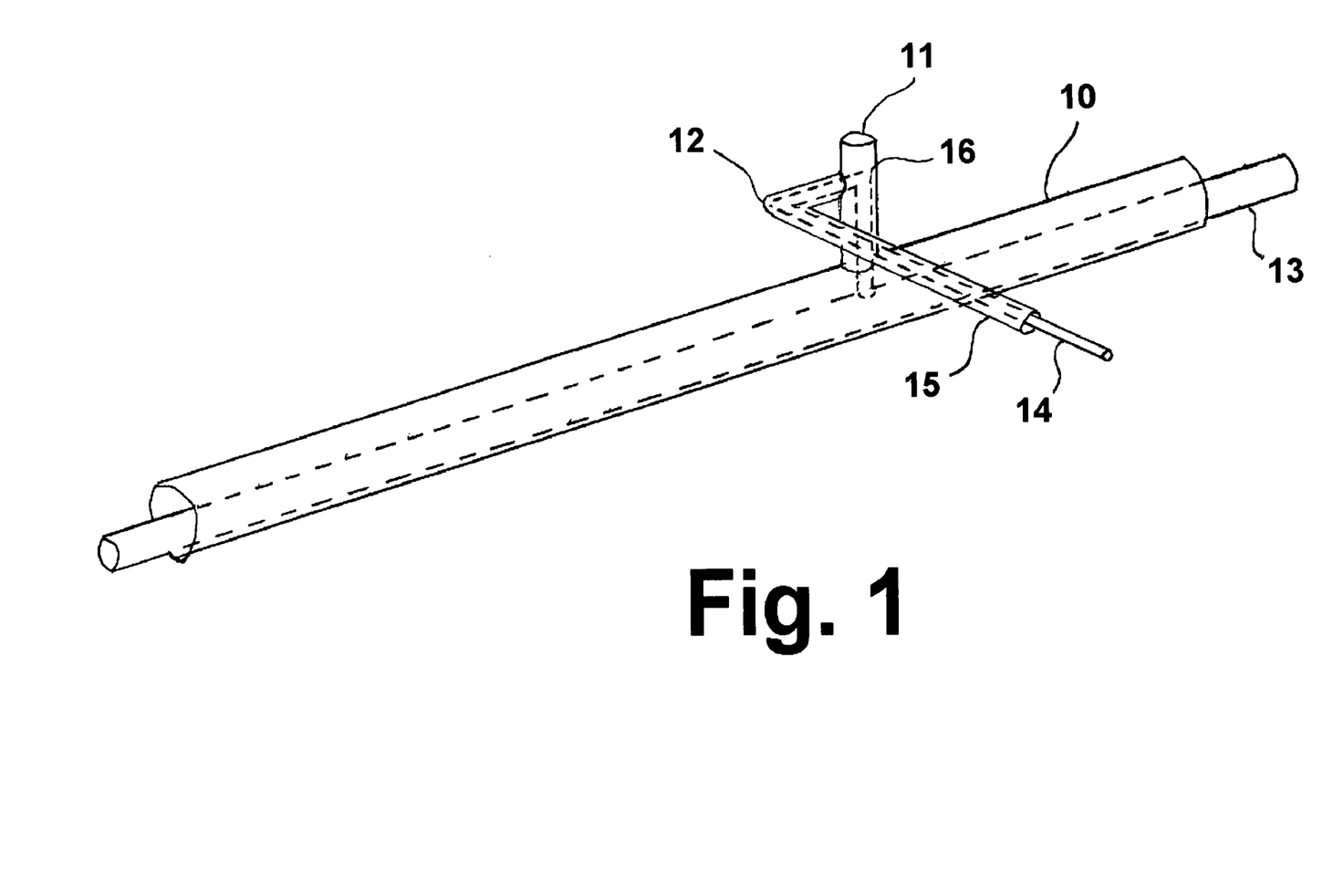
FIG. 1 shows an exemplary low pressure customer service tee arrangement to which the method and apparatus of this invention may be applied.

As used herein, the term "main" or "main line" refers to an underground pipeline through which a fluid, such as natural gas, is distributed to the fluid utility customers. As used herein, the term "service line" refers to an underground pipeline connecting the main line to the fluid utility customer. Connection of the service line to the main line is typically accomplished through the use of a service tee. FIG. 1 shows a typical low pressure service arrangement to which the method and apparatus of this invention may be applied. As shown therein, the service includes a straight main line section 10 and a service tee section 11, the latter of which comprises a service line 15 and first and second offsets, i.e. 90° turns 12, 16, respectively, which must be navigated during the slip-lining process. Also as shown therein, the method and apparatus of this invention may be used to insert a plastic pipe 13 in the main line 10 and a plastic pipe 14 in the service line 15.

Figure 2:
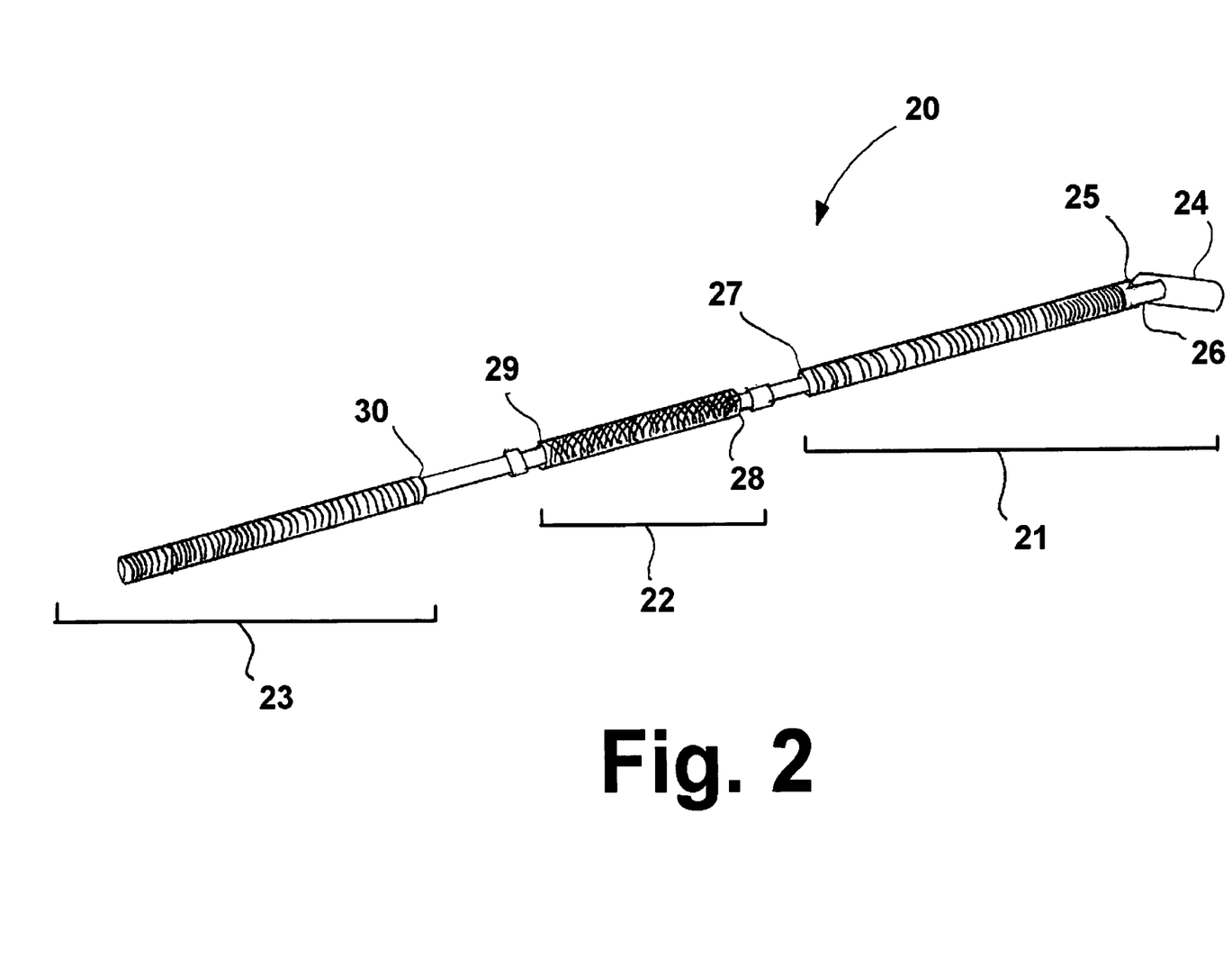
FIG. 2 shows an assembled slip-line cable in accordance with one embodiment of this invention.

FIG. 2 shows an assembled slip-line cable 20 in accordance with one embodiment of this invention. As shown therein, the three components making up the cable are the forward navigation section 21, which comprises a leading end 26 and a trailing end 27, the intermediate locking section 22, sometimes referred to herein by the acronym IDSL (inside diameter slide lock), having an intermediate leading end 28 and an intermediate trailing end 29, which leading end 28 is connected to the trailing end 27 of the forward navigation section 21, and the rearward drive section 23 having a front end 30, which front end is connected to the intermediate trailing end 29 of the intermediate locking section 22. Connections between the three components may be accomplished by any suitable means, such as threaded couplings, unions and the like.

Figure 3:
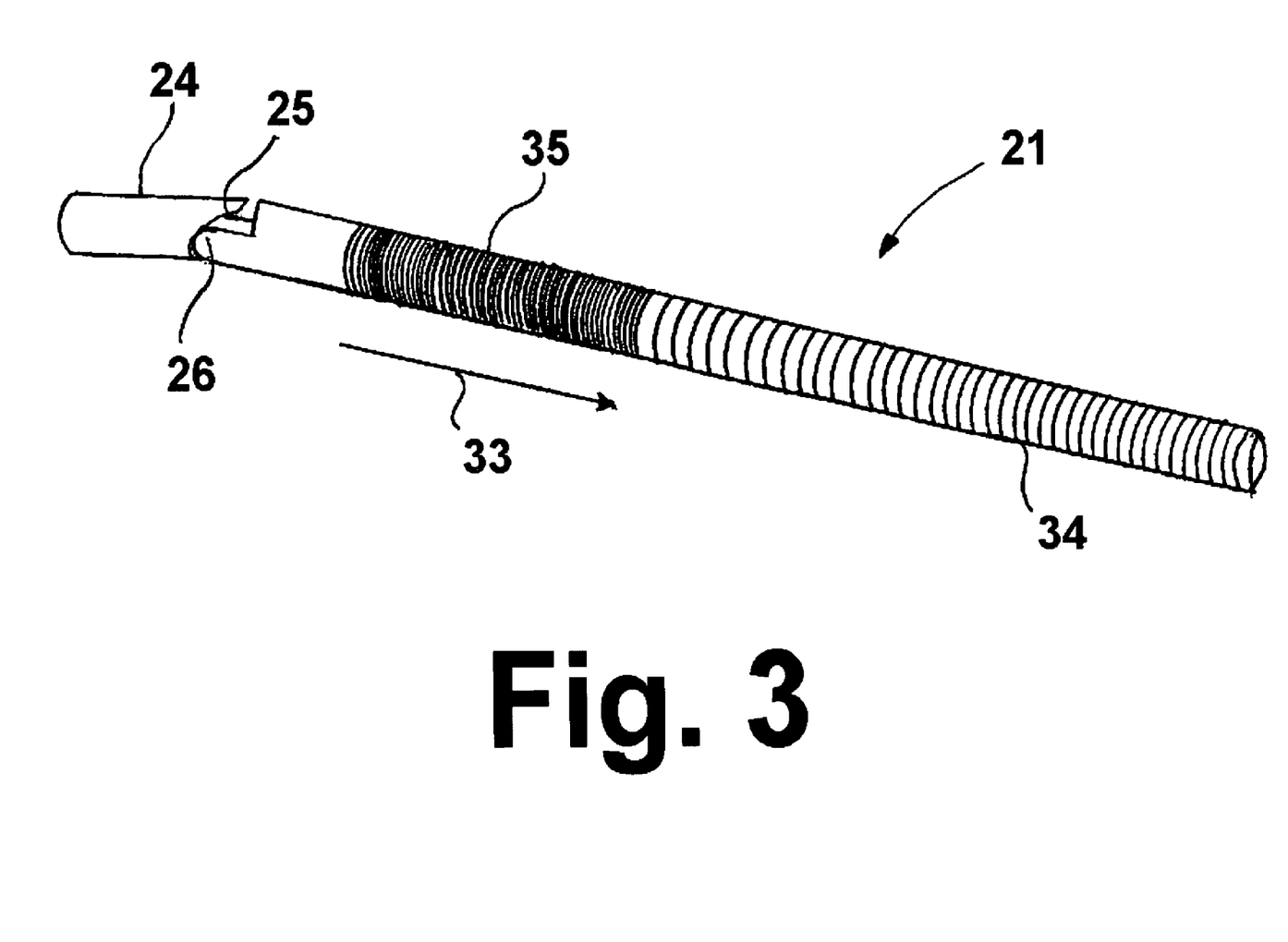
FIG. 3 shows the forward navigation section of the slip-line cable in accordance with one embodiment of this invention.

The purpose of flexible forward navigation section 21 of the slip-line cable 20 is to provide the means by which the slip-line cable is able to pass through offsets, such as the first and second 90° bends 12, 16 shown in connection with the service tee 11 shown in FIG. 1, that may be encountered during the slip-lining process. This section of the slip-line cable, shown in FIG. 3, is a specially designed push-pull cable having a variable stiffness, the direction of increasing stiffness being indicated by arrow 33, with respect to the distance from the leading end 26 of the cable. As shown in FIG. 3, the flexible forward navigation section of the slip-line cable comprises at the leading end thereof a weighted, pivotable tip 24 connected by means of a universal joint 25 to a variable stiffness leader section 35, which, in turn, is connected to a high stiffness section 34. In use, the weighted, pivotable tip 24, after guiding the flexible forward navigation section of the slip-line cable through the first 90° bend 12, drops downward to lead the trailing remaining sections of the flexible forward navigation section 21 through the second 90° bend and in the intended direction through the 90° bend (intersection of the branch and body) of the existing service into the main. The flexible forward navigation section 21 of the slip-line cable 20 must be of sufficient length beginning at the weighted, pivotable tip 24, to extend a distance from the main pipeline 10 through the offsets 12, 16, and about 2 feet beyond and on the customer side of the service line elbow. In accordance with a particularly preferred embodiment of this invention, the outside diameter of the flexible forward navigation section of the slip-line cable is about 0.020 inches less than the inside diameter of the plastic pipe in which it is being inserted. Once the more flexible end of the variable stiffness leader section 35 is pushed through the offsets, the increasingly stiffer back end thereof is sufficient to act as a guide for the plastic pipe to follow through the bends of the offsets. The variable stiffness leader section 35 is flexible enough, however, to reduce the potential for the leading edge of the new plastic pipe to hang up on the inlet corners or exit wall of the offsets, and to be withdrawn after the new plastic pipe service line is completely installed.

As previously suggested, the slip-line cable of this invention provides two primary functions, a guide function in which it provides a path followed by the plastic pipe as it is inserted into the pipeline and a pushing or driving function in which it pushes or drives the plastic pipe into the pipeline. To provide the requisite contact between the slip-line cable and the plastic pipe to enable pushing or driving of the plastic pipe into the pipeline, the slip-line cable comprises an intermediate locking section 22 connected to the trailing end 27 of the forward navigation section 21. This intermediate locking section, shown in FIG. 4, comprises a locking mechanism that is designed to lock the slip-line cable inside the plastic pipe at any location along the length of the pipe, preferably proximate the first encountered offset, without the need for rotational, pneumatic, or electronic expansion methods. Rather the locking mechanism works in conjunction with the rearward or axial drive section 23 of the slip-line cable and the drive means 55 for driving the plastic pipe described below through a series of axial translations.

Figure 4:
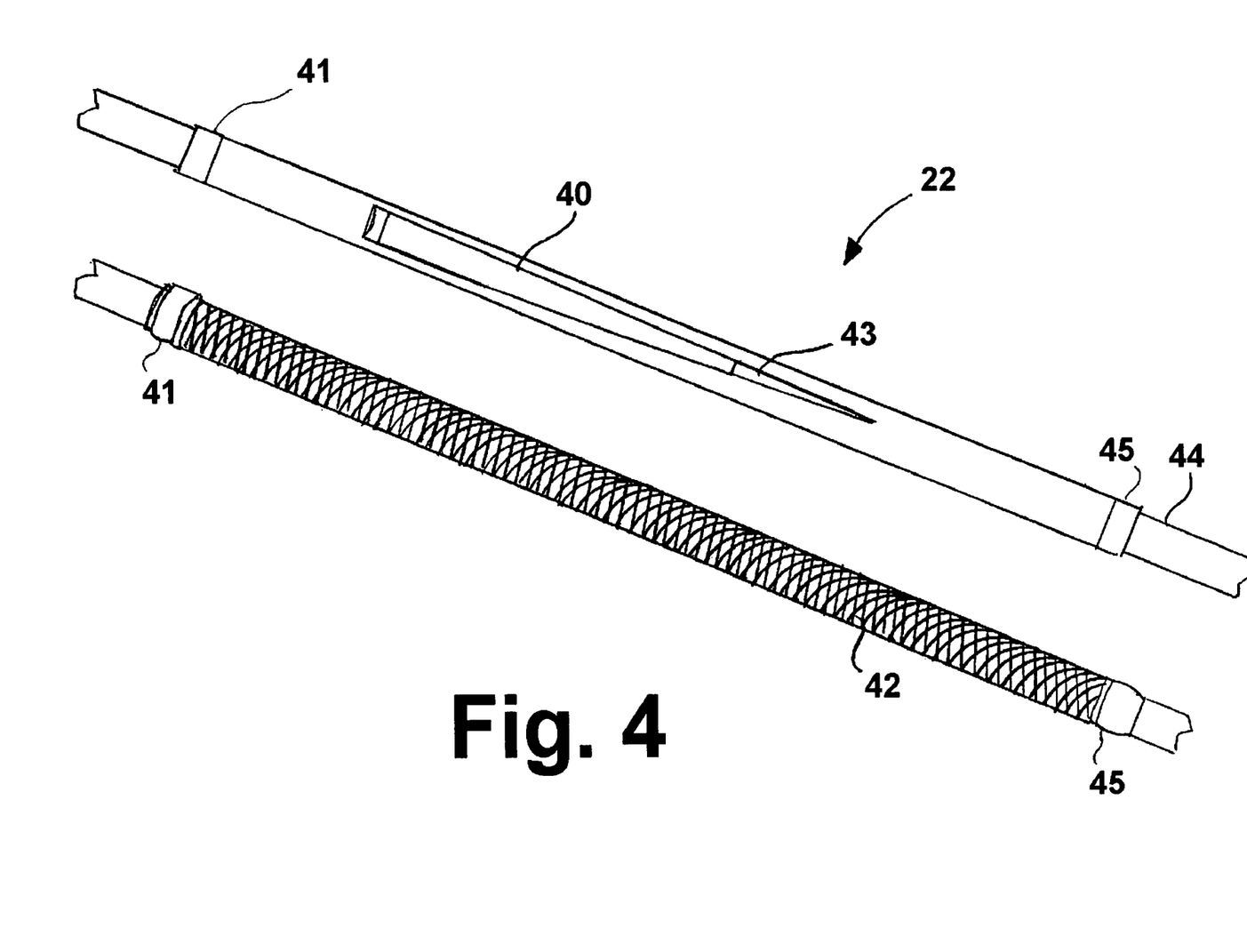
FIG. 4 shows the intermediate locking section of the slip-line cable in accordance with one embodiment of this invention.
Figure 7:
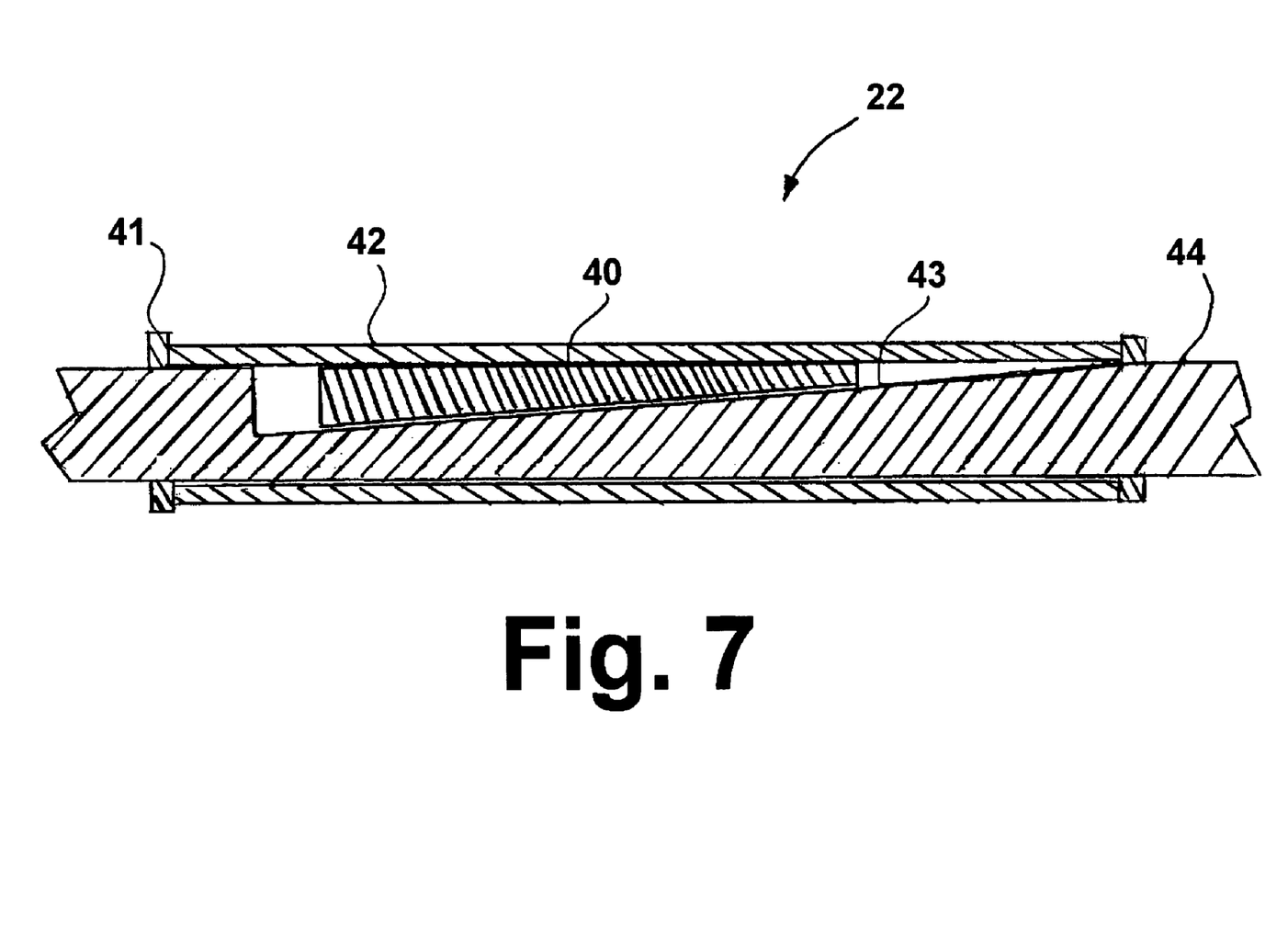
FIG. 7 is a cross-sectional view of the intermediate locking section of the slip-line cable in accordance with one embodiment of this invention.

As shown in FIGS. 4 and 7, the intermediate locking section 22 of the slip-line cable in accordance with one embodiment of this invention comprises a round steel bar 44, cut and machined to form an inclined planar surface 43, to match the facing inclined planar surface of stationary wedge 40 shaped to fit the inside diameter of the plastic pipe, and a radially expandable sleeve 42 that surrounds the wedge and slides along the machined bar between stops 41, 45 disposed proximate the ends of the intermediate locking section. In accordance with one embodiment of this invention, the radially expandable sleeve is a stainless steel braided sleeve. Stationary wedge 40 is maintained stationary by means of frictional contact with the inside surface of the stainless steel braided sleeve. Locking of the slip-line cable within the plastic pipe is accomplished by the opposing inclined surfaces of the wedge and the round steel rod 44, whereby one inclined surface slides relative to and against the other, reacting to the translatory movement of the external stainless steel braided sleeve. The relative movement of the inclined surfaces results in the radial expansion of the external stainless steel braided sleeve 42 to contact the inside surface of the plastic pipe such that the frictional force between the outside surface of the sleeve and the inside surface of the plastic pipe causes the sleeve to move along the set of wedges. The internal frictional force between the inside surface of the sleeve and the stationary wedge is used to hold the stationary wedge in place as the bar (entire cable) moves. When expanded in this manner, the sleeve is forced against the inside diameter of the plastic pipe to essentially lock itself inside the plastic pipe.

With the new plastic pipe partially inserted up to the first 90° bend or offset, the intermediate locking section is pushed through the new plastic pipe in conjunction with the specially designed cable. The plastic pipe is retracted slightly so that the forward navigation section of the slip-line cable can be inserted through all of the offsets and to the main. The position of the intermediate locking section during the plastic pipe insertion process is then preferably a few feet upstream of the first offset (service line elbow). The intermediate locking section is then retracted a few inches (to slide the outside sleeve forward), thereby disengaging the locking mechanism. The section is then pushed forward again to slide and expand the wedge, locking the device. The locked mode of the intermediate locking section substantially precludes the slip-line cable from being pushed forward anymore without also pushing the plastic pipe forward with it. The intermediate locking section is designed to retract its locking mechanism when tension force is applied. The retraction of the intermediate locking section slides the inclined surfaces of the stationary wedge and the rod relative to each other in a manner that reduces the outside diameter of the locking section and facilitates the removal of the entire slip-line cable from the inside of the plastic pipe. The intermediate locking section can be relocked at any time after it has been unlocked by pushing the slip-line cable forward (toward the main pipeline) relative to the plastic pipe to lock it in place. When locked, the plastic service pipe can again be pushed forward. This function is useful for operations in which the cable cannot be protruding past the leading edge of the plastic pipe and for long insertions where some of the axial force applied at the upstream end of the plastic pipe may be lost due to the spring mode of the plastic pipe. Axial force is required to stab the new plastic pipe into a new connection fitting installed at the street main.

Figure 5:
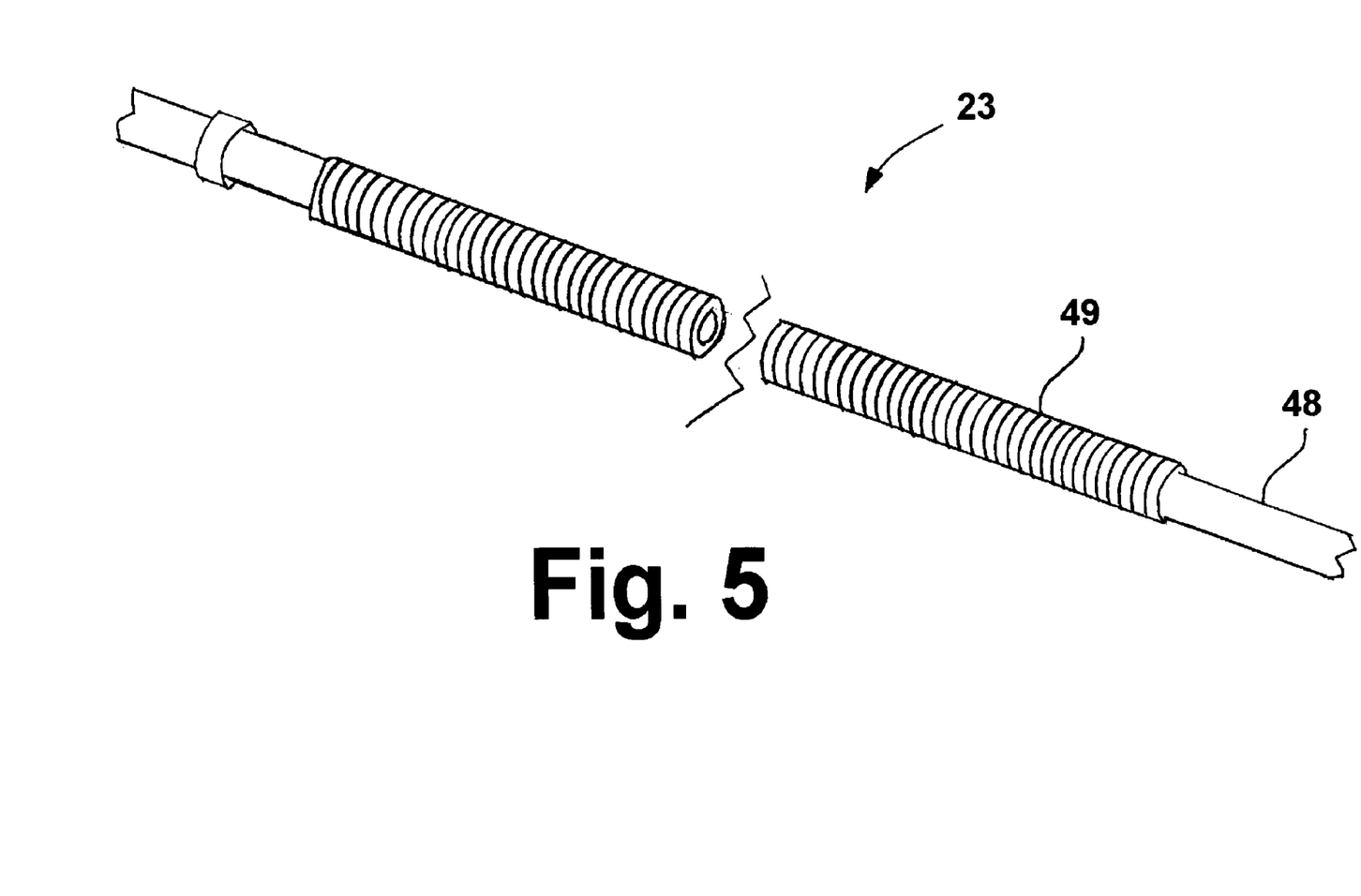
FIG. 5 shows the rearward drive section of the slip-line cable in accordance with one embodiment of this invention.

The rearward drive section 23 of the slip-line cable 20 in accordance with one embodiment of this invention is a push/pull type cable, as shown in FIG. 5, comprising a braided steel aircraft cable 48 wrapped by a spirally wound solid steel wire 49. When pulled, tension is on the braided aircraft cable. When pushed, the steel wire coil compresses and exhibits compressive strength. The front end 30 of the rearward drive section 23 is attached to the intermediate trailing end 29 of the intermediate locking section 22 of the slip-line cable and acts like a solid rod when under compression. This section of the slip-line cable allows the operator to push (or pull) the new plastic pipe from a remote upstream location with minimal deformation of the plastic pipe inside the existing service line. It also transmits impact closer to the leading edge of the plastic pipe much more efficiently than could be achieved by impacting the upstream end of the plastic pipe.

Figure 6:
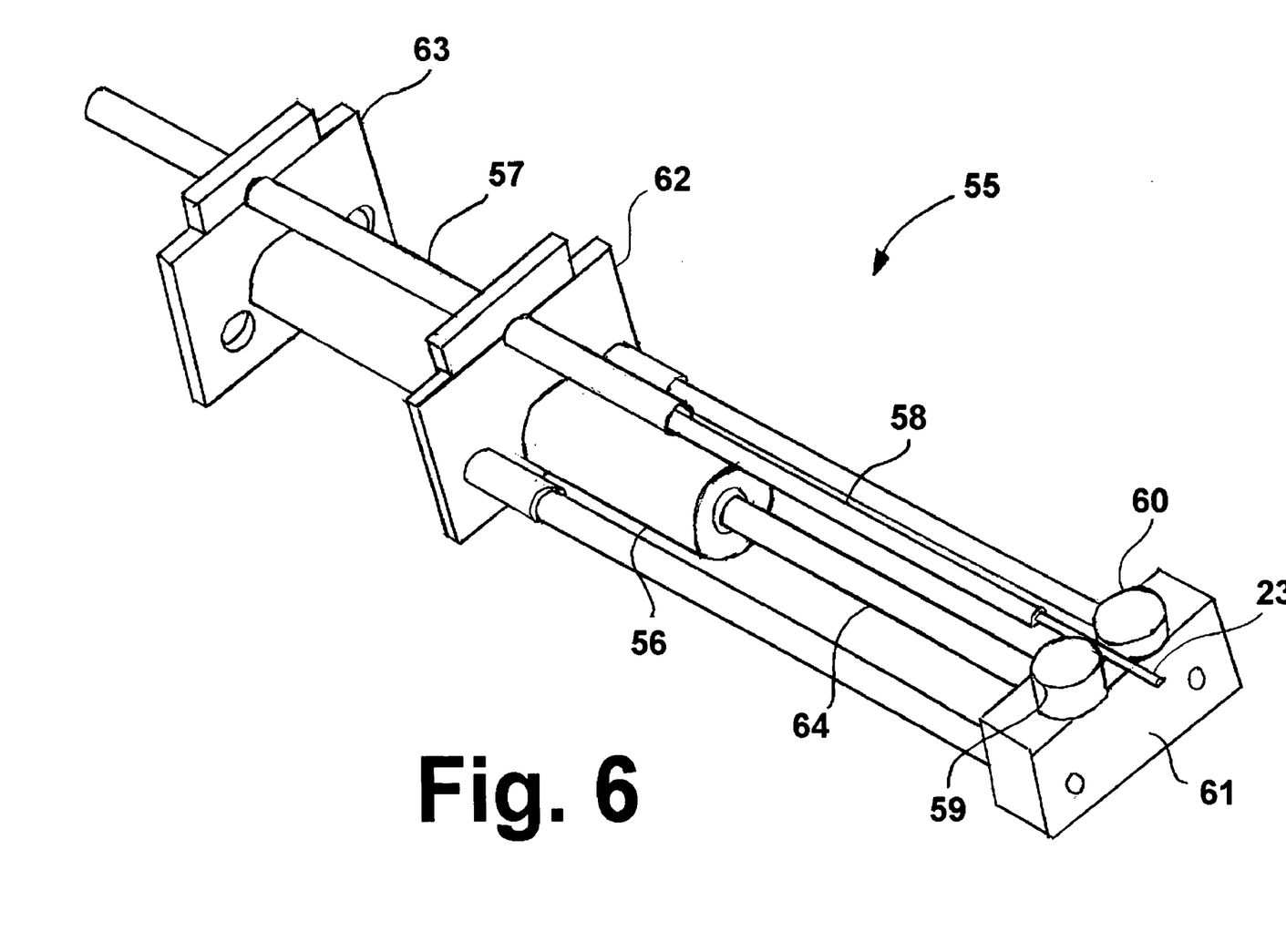
FIG. 6 shows an impact driver for driving the slip-line cable and, thus, the plastic pipe into the pipeline in accordance with one embodiment of this invention.

In addition to the slip-line cable as described herein above, the system of this invention further comprises drive means for pushing or driving the plastic pipe into the pipeline. In accordance with one embodiment of this invention, the drive means comprises a cable compressor/strike plate device 55 as shown in FIG. 6. Cable compressor/strike plate device 55 comprises a strike plate 61 attached to a pneumatic cylinder 56 by a piston shaft 64 such that movement of the strike plate 61 results in movement of a piston disposed within the pneumatic cylinder. The strike plate 61 further comprises locking means for locking onto the rearward drive section 23 of the slip-line cable. In accordance with one embodiment of this invention, the locking means comprises a pair of spaced apart cable clamping cams 59, 60 which are axially rotatable to contact and, thus, lock, the rearward drive section 23 of the slip-line cable disposed between the cams. The cable compressor/strike plate device clamps by means of clamps 62 and 63 onto the end of the segment of existing service line 57 to be replaced. It employs pneumatic force to push on (insert) the rearward drive section 23 of the slip-line cable and to maintain a constant compressive load on the cable at all times. This compressive load reduces the potential for accidental retraction of the rearward drive section, which would unlock the intermediate locking section of the cable. Additionally, this device applies the force required to push the plastic pipe along the forward navigation section of the cable and through the offsets. This compression action also ensures that both the plastic pipe and slip-line cable are forced to ripple within the pipeline being replaced or repaired. If this ripple is not present when the operator strikes the strike plate, most of the energy expended will be lost to this rippling effect instead of transferring to the leading edge of the plastic pipe. As shown in FIG. 6, the strike plate 61 of the cable compressor/strike plate device is designed to be struck with a hammer and to deliver impact force through the rearward drive section, to the intermediate locking section, and to the plastic pipe at the downstream locking point to more effectively push the plastic pipe through the offsets and into the existing main.

To slip-line an underground pipeline using the apparatus of this invention, the first step is to disconnect the main line from service and purge it with either air or nitrogen. Thereafter, the service tee to be slip-lined is identified. This may be done by any means, but typically is carried out by insertion of a video inspection robot into the main and navigating the robot down the main until the service tee is located. Once the service tee is identified, the existing service line is disconnected at the meter, some distance from the main so that the existing service line is slip-lined with the new plastic pipe from the meter side of the service pipe.

Slip-lining of the service line is accomplished by chamfering the leading edge of the plastic pipe and pushing the plastic pipe, leading edge first, into the service line until the first offset is reached. The plastic pipe is then cut, leaving a length of exposed plastic pipe extending beyond the entry point to the service line. After determining the distance from the first offset to the bottom of the service tee on the main, the slip-line cable described herein above is inserted into the plastic pipe until it reaches the first 90° bend of the offset. The plastic pipe is then pulled back from the first offset for a distance approximately corresponding to the previously determined distance from the first offset to the bottom of the service tee during which time the slip-line cable is held stationary against the first 90° bend. At this point, the intermediate locking section of the slip-line cable is activated, locking the slip-line cable with respect to the plastic pipe inside the plastic pipe.

Activation of the intermediate locking section of the slip-line cable is accomplished by pushing the plastic pipe a short distance into the plastic pipe while holding the slip-line cable in place, thereby sliding the external stainless steel braided sleeve of the intermediate locking section forward and arming the locking section. The plastic pipe is then retracted while holding the slip-line cable in place, resulting in locking of the intermediate locking section and preventing the cable and the plastic pipe from moving independently. Thereafter, both the cable and the plastic pipe are pushed by hand as a result of which the forward navigation section of the slip-line cable will pass through the first 90° bend and the service tee into the main line. However, once the plastic pipe encounters the 90° bend, it will no longer be possible to push the plastic pipe by hand.

At this point in the slip-line process, the cable compressor/strike plate device is attached to the existing service line and clamped to the rearward drive section of the slip-line cable. The pneumatic cylinder is then pressurized, thereby taking up any existing slack of the plastic pipe and the rearward drive section. The strike plate is hit with a hammer or other suitable driving means, moving the slip-line cable and forcing the plastic pipe through the 90° bends of the offset. The strike plate is repeatedly hammered until the plastic pipe reaches the bottom of the service tee. The slip-line cable is then retracted until the forward navigation section no longer protrudes past the leading edge of the plastic pipe in the street main. The slip-line cable is then pushed forward to relock the intermediate locking section. The strike plate may be struck again to further push the plastic pipe into the main to facilitate any operation necessary by the utility without the obstruction of the forward navigation section protruding past the tip of the plastic pipe.

While in the foregoing specification this invention has been described in relation to certain preferred embodiments thereof, and many details have been set forth for the purpose of illustration, it will be apparent to those skilled in the art that the invention is susceptible to additional embodiments and that certain of the details described herein can be varied considerably without departing from the basic principles of this invention.

We claim:

1. An apparatus for slip-lining a pipeline with plastic pipe, said apparatus comprising:

a slip-line cable having an outside diameter less than an inside diameter of said plastic pipe, said slip-line cable having a flexible forward navigation section having a leading end and a trailing end, an intermediate locking section having an intermediate leading end connected to said trailing end and having an intermediate trailing end, said intermediate locking section having locking means for temporarily preventing said slip-line cable from moving inside said plastic pipe, and a rearward drive section having a front end connected to said intermediate trailing end and having an opposite drive end; and drive means for driving said plastic pipe into said pipeline, said drive means lockably connected to said drive end of said rearward drive section.

2. An apparatus in accordance with claim 1 further comprising guide means for guiding said forward navigation section through at least one offset in said pipeline, said guide means connected to said leading end.

3. An apparatus in accordance with claim 2, wherein said guide means is connected to said leading end by a universal joint.

4. An apparatus in accordance with claim 3, wherein said guide means comprises a weighted tip.

5. An apparatus in accordance with claim 1, wherein said forward navigation section has a variable stiffness with stiffness of said forward navigation section increasing towards said trailing end.

6. An apparatus in accordance with claim 1, wherein said intermediate locking section comprises expansion means for temporarily expanding an outer surface of said intermediate locking section to contact an inside surface of said plastic pipe.

7. An apparatus in accordance with claim 6, wherein said outer surface of said intermediate locking section comprises a radially expandable screen mesh.

8. An apparatus in accordance with claim 1, wherein said intermediate locking section comprises an elongated metal rod, an elongated wedge having a first inclined planar surface with a first angle of inclination facing a longitudinal axis of said elongated metal rod, said elongated metal rod having a second inclined planar surface facing said first inclined planar surface, said second inclined planar surface having a second angle of inclination complementary to said first angle of inclination whereby, in an unlocked condition of said intermediate locking section, an outer wedge surface of said elongated wedge is substantially flush with an outer surface of said elongated metal rod, an expandable circumferential sleeve disposed around said elongated metal rod and said elongated wedge, said expandable circumferential sleeve having an internal surface in contact with said outer wedge surface, and a circumferential rod stop connected with each end of said circumferential expandable sleeve and disposed around said elongated metal rod.

* * * * *